(12) United States Patent
De Angelis

(10) Patent No.: US 6,513,792 B1
(45) Date of Patent: Feb. 4, 2003

(54) ROPE DEFLECTION AND SUITABLE SYNTHETIC FIBER ROPE AND THEIR USE

(75) Inventor: Claudio De Angelis, Lucerne (CH)

(73) Assignee: Inventio AG, Hergiswil (CH)

( * ) Notice: Subject to any disclaimer, the term of this patent is extended or adjusted under 35 U.S.C. 154(b) by 142 days.

(21) Appl. No.: 09/678,913

(22) Filed: Oct. 4, 2000

(30) Foreign Application Priority Data

Oct. 21, 1999 (EP) .............................................. 99810960

(51) Int. Cl.[7] ................................................. B66D 1/30
(52) U.S. Cl. ...................................... 254/374; 187/254
(58) Field of Search ........................... 254/374; 187/254

(56) References Cited

U.S. PATENT DOCUMENTS

| | | | |
|---|---|---|---|
| 3,451,022 A | 6/1969 | Stanton | |
| 4,013,142 A | * 3/1977 | Hagg | 187/254 |
| 4,753,322 A | * 6/1988 | Yasuda | 187/254 |
| 5,666,786 A | 9/1997 | De Angelis et al. | |
| 5,881,843 A | * 3/1999 | O'Donnell et al. | 187/254 |
| 6,314,711 B1 | * 11/2001 | De Angelis | 57/210 |
| 6,318,504 B1 | * 11/2001 | De Angelis | 187/254 |
| 6,321,520 B1 | * 11/2001 | De Angelis | 57/223 |
| 6,364,063 B1 | * 4/2002 | Aulanko et al. | 187/254 |
| 6,371,448 B1 | * 4/2002 | De Angelis | 254/374 |

FOREIGN PATENT DOCUMENTS

| | | |
|---|---|---|
| DE | 8 909 450 | 11/1990 |
| EP | 0 282 709 | 9/1988 |
| EP | 0 565 956 | 10/1993 |
| EP | 0 672 781 | 9/1995 |
| FR | 2 312 449 | 12/1976 |

* cited by examiner

*Primary Examiner*—Emmanuel Marcelo
(74) *Attorney, Agent, or Firm*—MacMillan, Sobanski & Todd, LLC

(57) ABSTRACT

In a rope deflection, such as preferably a traction sheave drive for an elevator, the diameter at the rope contacting surface and the lay length of a synthetic fiber rope passing over it are related to each other in such a way that within the angle of wrap of the rope, each of the strands of the covering layer of strands lies on the traction sheave at least three times. This relationship achieves a permanently reliable rope drive with a synthetic fiber rope for use on pulleys or traction sheaves, with which irreversible displacements of strands in the covering layer of strands of the synthetic rope can be reliably avoided.

11 Claims, 2 Drawing Sheets

ROPE DEFLECTION AND SUITABLE SYNTHETIC FIBER ROPE AND THEIR USE

BACKGROUND OF THE INVENTION

The invention relates to a rope deflection and a synthetic fiber rope suitable for use with it.

Especially in materials handling technology, as for example on elevators, in crane construction, in mining, or similar applications, ropes are an important element of machinery and subject to heavy use. As a loaded rope passes over a deflection element, as for example a rope pulley, rope sheave, or rope drum, etc. it is bent over the deflection element, which causes special movements of the strands of the rope.

A correspondingly used rope is known, for example, from the European patent document EP 0 672 781 A1. In respect of service life, high wear resistance, and high reverse bending strength, the multi-layered parallel twisted aramide fiber stranded rope provides very satisfactory values; however, it has been established that when the permanently loaded synthetic fiber rope is deflected on a traction sheave, a rope drum, a rope pulley, or similar, within a short period of operation corkscrew-like rope deformations can form in the tensioned area of the covering layer of strands, which could lead to a reduction in the breaking force of the rope or even to failure of the rope.

SUMMARY OF THE INVENTION

The present invention concerns a permanently reliable rope deflection with a synthetic fiber rope passing over pulleys or traction sheaves.

According to the invention this objective is achieved by means of a rope deflection wherein the synthetic fiber rope lies on the deflecting element at least along a length of three lay lengths of the rope lay.

The essence of the invention is therefore that the diameter of the deflection element and the lay length of the synthetic fiber rope are adapted to each other in such a way that within the angle of wrap the strands of the covering layer of strands always lie on the deflection element at least three times.

Extensive tests have shown that the smaller the arc of wrap and the larger the lay length of the covering layer of strands, the more strands are displaced as bending takes place over a rope pulley, a rope sheave, a rope drum, or similar. The shorter the lay length and the larger the deflecting element, the smaller are the movements of the strands relative to each other.

From this the knowledge has been gained that the shorter the rope lay length of the covering layer, the smaller the diameter of the rope pulley, traction sheave, or similar that can be selected. In addition, according to the present invention it has been established as a minimal requirement that within the angle of wrap the strands should lie on the traction sheave at least three times for an irreversible displacement of strands to be reliably avoided.

Moreover, in developing the invention further, it became known that the less frequently the moving strand lies on the base of the groove of the driven rope sheave, the more easily overlengths can occur in the area experiencing tension.

It is well known that the function of such rope drives is based on the driving force being transferred to the rope via the section of rope which is in contact with the traction sheave at any specific time. As the rope passes over the traction sheave it is bent and, as this occurs, especially in the area in the covering layer of strands which is experiencing tension, the missing length is correspondingly displaced. At the same time, mainly in the area of the rope experiencing pressure, the strands are pushed away from the traction sheave. To meet these many and varied stresses on the rope, the internal balancing of the rope system is of especial importance.

For this reason, according to a preferred embodiment of the invention, in the case of a rope drive with a synthetic fiber rope with intersheath, the formation of overlengths in the area of tension is prevented if the diameter of the traction sheave and the length of the rope lay are adapted to each other in such a way that the strands of the covering layer of strands lie on the traction sheave at least four times. With this form of rope with intersheath, overlengths in the area of tension are less reversible the higher the coefficient of friction between the intersheath and the covering layers of strands, because when the rope is loaded the strands are fixed by the constrictive pressure.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
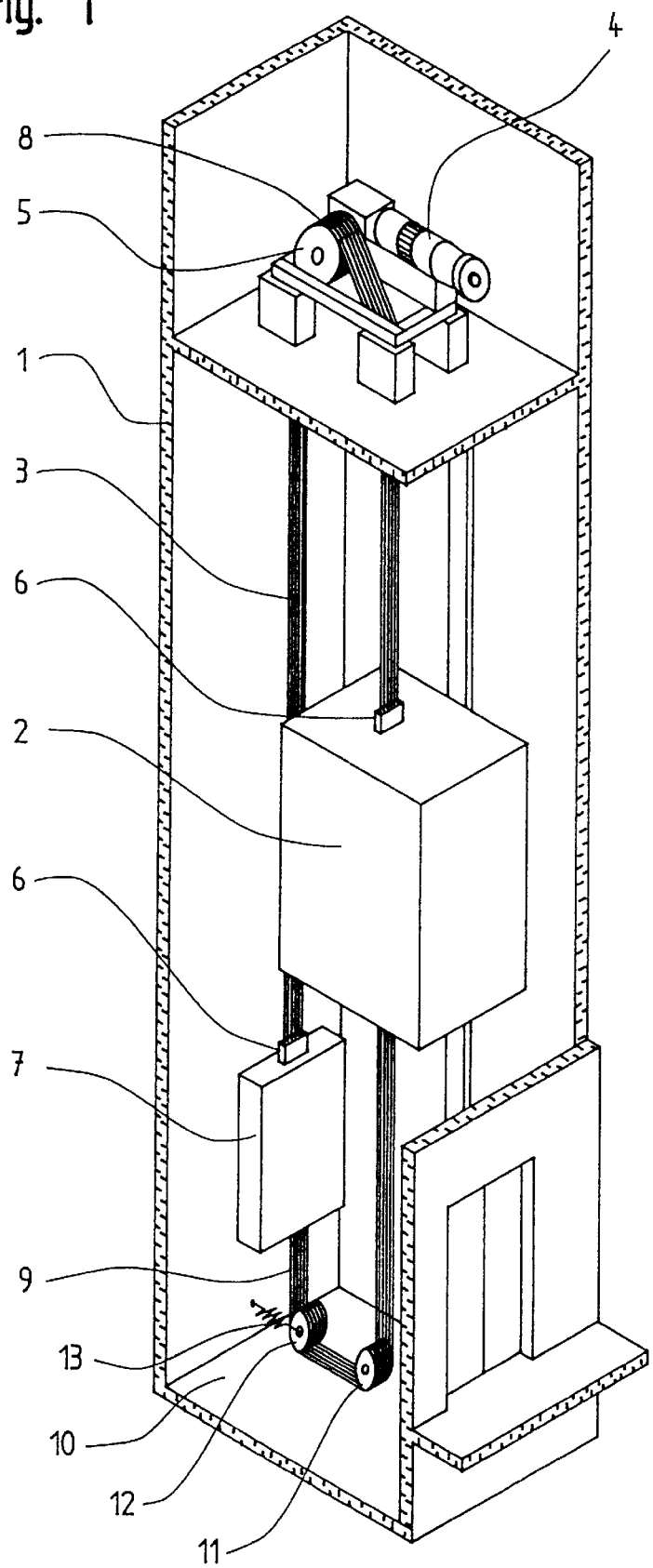
FIG. 1 is a fragmentary perspective view of a rope deflection on an elevator installation with a car connected to a counterweight by means of synthetic fiber stranded ropes according to the present invention.

As shown in FIG. 1, an elevator car 2 guided in a hoistway 1 hangs on several, here six, drive ropes 3 of load-bearing aramide fibers, which ropes pass over a traction sheave 5 that is connected to a drive motor 4 mounted at the top of the hoistway. On the top of the car 2 there is a rope end connector 6 to which an end of each of the ropes 3 is fastened. The other end of each of the ropes 3 is fastened in the same manner to one of the connectors 6 on a top of a counterweight 7 which is also guided in the hoistway 1. Compensating ropes 9 are fastened in a similar manner by their first end to the underside of the car 2. The compensating ropes 9 pass over a first deflector sheave 11, that is located on a hoistway floor 10 and aligned directly beneath the hitch point on the car floor, and over an adjacent second deflector sheave 12, that is also mounted on the hoistway floor 10 and aligned under the counterweight 7. The other end of each of the ropes 9 is fastened in a similar manner to the lower part of the counterweight 7. Along their length between the car 2 and the counterweight 7, the compensating ropes 9 are tensioned with the aid of weights or as shown here by means of the sheave or pulley 12. The purpose is served here by an extension spring 13 that is anchored to the hoistway wall and pulls the deflector sheave 12 in the direction of the hoistway wall, thereby tensioning the compensating ropes 9. Instead of the extension spring 13, the deflector sheave 12 can also be fitted with a suitable kinematic device to tension the compensating ropes 9.

The traction sheave 5 has six circumferential grooves 8 lying close to each other, each of which receives one of the twisted drive ropes 3 according to the present invention as described further below. In elevator construction, traction sheaves with from two to twelve grooves are usual hitherto. In the embodiment described here, the grooves 8 are formed having a semicircular section. Other forms of groove are, however, also possible which the specialist knows and can provide according to the form of the rope cross section used in each case without the essence of the invention thereby being altered.

Figure 2:
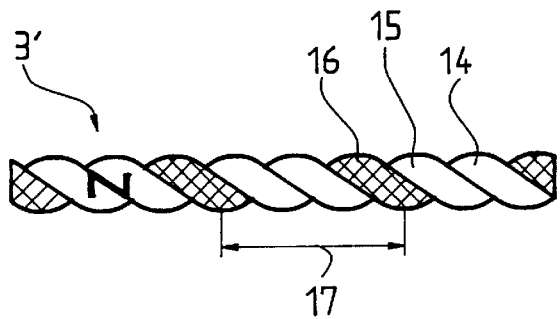
FIG. 2 is an elevation view of a section of the twisted stranded rope shown in the FIG. 1.

For the purpose of defining terms, FIG. 2 shows as an example a section of synthetic fiber rope 3' having three aramide fiber strands 14, 15 and 16 laid in a manner which in itself is known, with a twist Z (indicated by the letter "Z" on its side). The aramide strands 14, 15 and 16 lie helically close to each other, the slope of the helix essentially following the central stroke of the letter Z. The length of the lay is shown in the drawing by taking as an example the crosshatched aramide strand 16 and designating the lay length as 17. The designations in the example illustrated here can be transferred beyond it to the actual multi-layer synthetic fiber ropes 3 in the present invention, on which the advantages which can be achieved with the knowledge according to the invention become greater as the number of layers of strands increases. The direction of twist of the individual layers of strands is here of lesser importance; it is much more the sequence of layers of strands having different directions of twist, especially adjacent to the covering layer of strands, which is essential to the invention.

When use is made of synthetic fiber ropes with an intersheath between individual layers of strands, displaced overlengths in that part of the bent rope which is under tension are less reversible for an increasing coefficient of friction between the intersheath and the covering layer of strands, because when the rope is loaded the pulled strand is fixed by the constrictive pressure. For this reason, according to the invention the higher the coefficient of friction between the intersheath and the covering layer of strands, the more frequently a strand of the covering layer should lie on the traction sheave within the angle of wrap.

Figure 3:
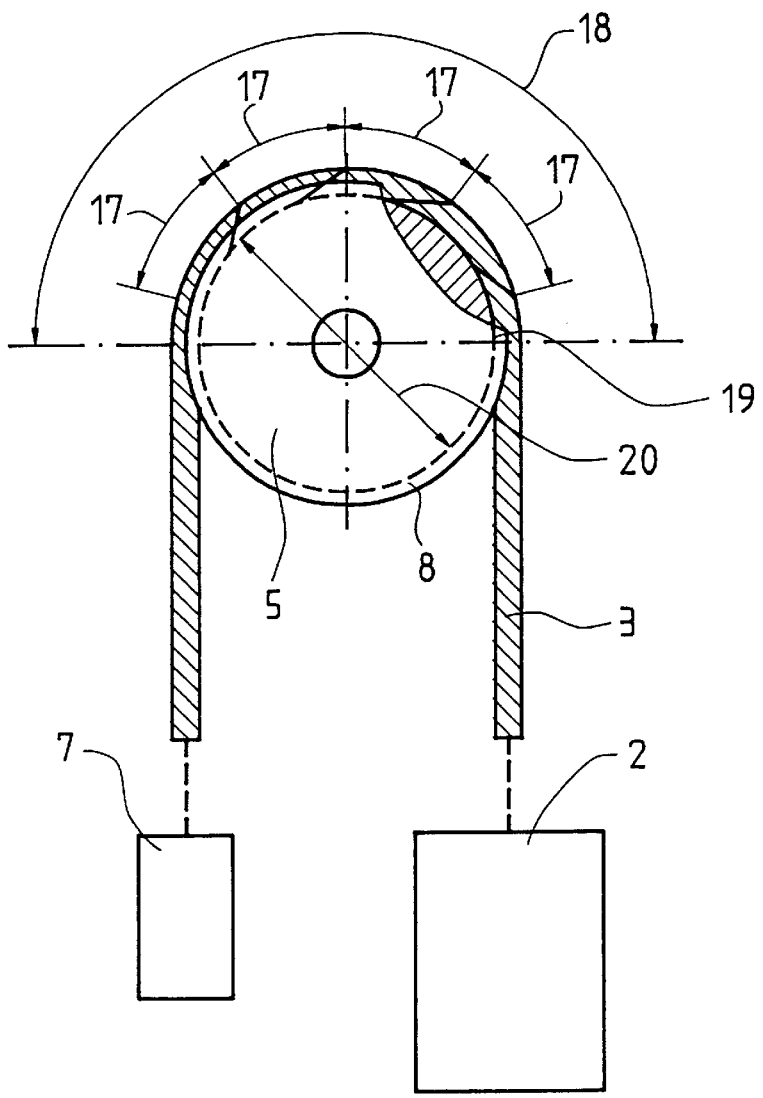
FIG. 3 is a schematic elevation view of a rope sheave in the direction of its axis of rotation and a laid drive rope according to the present invention passing over it.

FIG. 3 shows the rope sheave 5 and one of the drive ropes 3 passing thereover. The rope 3 is connected at the one end to the car 2 and at the other end to the counterweight 7, due to whose inertia forces the rope 3 is permanently loaded as it passes over the rope sheave 5. The weight of car 2 and counterweight 7 ensures an adequate frictional engagement between the traction sheave 5 and the section of the rope 3 lying over an angle of wrap 18 on the traction sheave 5. In this embodiment of a rope drive according to the present invention, a diameter 20 of the traction sheave 5 at a bottom of the groove 8 has a dimension greater than 250 mm, approximately 260 mm. Consequently, the lay length 17 of the covering layer of strands may not be longer than a range of approximately 60 to 80 mm. Within the meaning of the present invention, the minimum allowable angle of wrap is therefore approximately 120°. In FIG. 3, an angle of wrap of 180° is shown. However, an angle of wrap of 140° is also common, as shown implemented in the embodiment according to FIG. 1, for example. With such embodiments, however, it is the case anyway that as the rope 3 passes over the traction sheave 5 it always lies over an arc of wrap on the traction sheave whose length is greater than three lay lengths 17 of the twisted drive rope.

As well as being used purely as a suspension rope, the rope 3 can be used in a wide range of equipment for handling materials, examples being elevators, hoisting gear in mines, building cranes, indoor cranes, ship's cranes, aerial cableways, and ski lifts, as well as a means of traction on escalators. The drive can be applied by friction on traction sheaves or Koepe sheaves, or by the rope being wound on rotating rope drums. A drive rope is to be understood as a moving, driven rope, which is sometimes also referred to as a traction or suspension rope.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A rope deflection comprising:
    a sheave having a circumferential rope contact surface; and
    a synthetic fiber rope having a plurality of load-bearing synthetic fiber strands laid in a twist with a predetermined lay length and contacting said contact surface along an arc of a circle, said arc being less than 360 degrees, said synthetic fiber rope contacting said contact surface along a length of at least three of said lay lengths.

2. The rope deflection according to claim 1 wherein said sheave has at least one groove formed therein defining said contact surface and each of said synthetic fiber strands contacts said contact surface at least three times.

3. The rope deflection according to claim 1 wherein said synthetic fiber rope contacts said contact surface along an arc of a circle defined by an angle of wrap in a range from 120° up to and including 180°.

4. The rope deflection according to claim 1 wherein a diameter of said sheave at said contact surface is greater than 250 mm.

5. The rope deflection according to claim 1 wherein said synthetic fiber rope has an outer covering layer of said synthetic fiber strands with a lay length of approximately 60–80 mm.

6. A rope deflection comprising:
    a sheave having a plurality of circumferential grooves formed therein; and
    a plurality of synthetic fiber ropes each having a plurality of load-bearing synthetic fiber strands laid in a twist with a predetermined lay length and contacting an associated one of said grooves along an arc of a circle, said arc being less than 360 degrees, each said synthetic fiber rope contacting said associated groove along a length of at least three of said lay lengths.

7. The rope deflection according to claim 6 wherein each said synthetic fiber rope has an outer covering layer of said synthetic fiber strands with a lay length of approximately 60–80 mm.

8. The rope deflection according to claim 6 wherein said synthetic fiber strands are formed of aromatic polyamide material.

9. A synthetic fiber rope for use with a rope deflection sheave comprising a rope having a plurality of load-bearing synthetic fiber strands laid in an outer layer, said synthetic fiber strands being laid in a twist with a predetermined lay length, said predetermined lay length being selected whereby when the rope contacts a surface of a rope deflection sheave along an arc of a circle defining an angle of wrap, each said synthetic fiber strand contacts the sheave surface at least three times.

10. A rope deflection comprising:
    a sheave having a circumferential rope contact surface; and a synthetic fiber rope having a plurality of load-bearing synthetic fiber strands laid in a twist with a predetermined lay length and contacting said contact surface along an arc of a circle, said arc being approximately 180 degrees, said synthetic fiber rope contacting said contact surface along a length of at least three of said lay lengths.

11. The rope deflection according to claim 10 wherein said sheave is an elevator traction sheave and has at least one groove formed therein defining said contact surface, and wherein each of said synthetic fiber strands contacts said contact surface at least three times.

* * * * *